US012731264B2

(12) United States Patent
Li et al.

(10) Patent No.: US 12,731,264 B2
(45) Date of Patent: Sep. 8, 2026

(54) TARGET OBJECT SEGMENTATION METHOD AND RELATED DEVICE

(71) Applicant: Beijing ESWIN Computing Technology Co., Ltd., Beijing (CN)

(72) Inventors: Weiqi Li, Beijing (CN); Juwei Guan, Beijing (CN); Yuandong Huang, Beijing (CN); Andy Zhou, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 532 days.

(21) Appl. No.: 18/174,022

(22) Filed: Feb. 24, 2023

(65) Prior Publication Data

US 2023/0326035 A1 Oct. 12, 2023

(30) Foreign Application Priority Data

Apr. 11, 2022 (CN) ......................... 202210371616.4

(51) Int. Cl.
*G06K 9/00* (2022.01)
*G06T 3/40* (2006.01)
(Continued)

(52) U.S. Cl.
CPC .................. *G06T 7/12* (2017.01); *G06T 3/40* (2013.01); *G06T 7/187* (2017.01); *G06T 2207/10016* (2013.01); *G06T 2207/20084* (2013.01)

(58) Field of Classification Search
CPC ........ G06V 20/70; G06V 10/26; G06V 10/42; G06V 10/44; G06V 10/806; G06V 10/80;
(Continued)

(56) References Cited

U.S. PATENT DOCUMENTS 11,562,489 B2 * 1/2023 Ramani ................ G06V 40/107
2021/0279887 A1 9/2021 Ma et al.
(Continued)

FOREIGN PATENT DOCUMENTS

CN 103119609 A 5/2013
CN 109801293 A 5/2019
(Continued)

OTHER PUBLICATIONS

J. Xing, H. Ai and S. Lao, "Hierarchical video object segmentation," The First Asian Conference on Pattern Recognition, Beijing, China, 2011, pp. 67-71 (Year: 2011).*
(Continued)

*Primary Examiner* — Gregory A Morse
*Assistant Examiner* — Kevin M Coomber
(74) *Attorney, Agent, or Firm* — Westrman, Champlin & Koehler, P.A.

(57) ABSTRACT

Disclosed is a target object segmentation method and a related device, the target object segmentation method comprises: obtaining an input image containing a target object in a video; inputting the input image to a preset target object segmentation model, outputting a first target object segmentation image after segmentation is performed by the target object segmentation model; performing a target object contour segmentation on the input image to obtain a second target object segmentation image; performing a merging operation on corresponding pixels in the first target object segmentation image and the second target object segmentation image to obtain a final target object segmentation image. If one of the corresponding pixels is a target object pixel, the target object pixel is presented as a pixel located at a corresponding position in the final target object segmentation image after the merging operation is performed. Target object segmentation accuracy is improved.

10 Claims, 5 Drawing Sheets

(51) Int. Cl.
*G06T 7/12* (2017.01)
*G06T 7/187* (2017.01)

(58) Field of Classification Search
CPC ........... G06V 10/267; G06T 7/10; G06T 7/12; G06T 7/194; G06T 2207/30196; G06T 7/174; G06T 2207/20221; G06T 7/187; G06T 3/40; G06T 2207/20084; G06T 2207/10016
See application file for complete search history.

(56) References Cited

U.S. PATENT DOCUMENTS

| | | | | |
|---|---|---|---|---|
| 2022/0058452 | A1* | 2/2022 | Zhang | G06T 1/0007 |
| 2022/0237799 | A1* | 7/2022 | Price | G06T 7/174 |

FOREIGN PATENT DOCUMENTS

| | | | | |
|---|---|---|---|---|
| CN | 111104962 A | | 5/2020 | |
| CN | 112950647 A | | 6/2021 | |
| CN | 113392840 A | | 9/2021 | |
| CN | 114821048 A | | 7/2022 | |
| CN | 114860184 A | | 8/2022 | |
| CN | 114863436 A | | 8/2022 | |
| WO | WO-2014047856 A1 | * | 4/2014 | G06T 7/215 |

OTHER PUBLICATIONS

L. Ding and L. Bruzzone, "A Deep Architecture Based on a Two-Stage Learning for Semantic Segmentation of Large-Size Remote Sensing Images," IGARSS 2019—2019 IEEE International Geoscience and Remote Sensing Symposium, Yokohama, Japan, 2019, pp. 5228-5231 (Year: 2019).*

Pulse worm, "MATLAB will merge the results of two divisions", https://blog.csdn.net/qq_36763031/article/details/110933582, Dec. 9, 2020, 2 pages. (Year: 2020).*

Translation of Office Action for Chinese Office Action for Chinese Application No. 2022103716164, dated Apr. 11, 2025, 20 pages.

Li Shijin, "Hydrological Sheet Color Image Segmentation Based on Gradient and Color Information", Journal of Data Acquisition and Processing, vol. 31, No. 1, Jan. 15, 2016, 9 pages.

Pulse worm, "MATLAB will merge the results of two divisions", https://blog.csdn.net/qq_36763031/article/details/110933582, Dec. 9, 2020, 2 pages.

* cited by examiner

TARGET OBJECT SEGMENTATION METHOD AND RELATED DEVICE

CROSS-REFERENCE TO RELATED APPLICATIONS

The present application claims priority to Chinese Patent Application No. 202210371616.4, filed on Apr. 11, 2022, entitled by "TARGET OBJECT SEGMENTATION METHOD AND RELATED DEVICE", and published as CN114821048A on Jul. 29, 2022, which is incorporated herein by reference in its entirety.

FIELD OF TECHNOLOGY

The present disclosure relates to a technical field of video processing, in particular to a target object segmentation method and a related device.

BACKGROUND

With the popularity and popularization of an online education, a teaching video has become an indispensable educational resource. The teaching video is a video obtained by shooting a teaching scenario with a camera. In the teaching scenario, a teacher may occlude board writing due to teaching needs, so it is necessary to first perform a portrait segmentation, when a complete board writing image of board writing data is extracted from an image frame of the teaching video. Wherein, the portrait to be segmented is regarded as a target object, and the remaining portion is regarded as background. The target object mentioned herein includes not only the teacher's body parts, but also belongings carried by the teacher. However, the current portrait segmentation technology has some problems, such as low segmentation accuracy, high computational complexity, and great environmental impact, so that foreground content may not be incompletely segmented, or the background content may be wrongly segmented.

SUMMARY

In order to solve the above technical problems, the present disclosure provides a target object segmentation method and a related device, which can improve target object segmentation accuracy.

According to a first aspect of the present disclosure, a target object segmentation method is provided, wherein the target object segmentation method comprises:

- obtaining an input image containing a target object in a video;
- inputting the input image to a preset target object segmentation model, and outputting a first target object segmentation image after a segmentation is performed on the input image by the target object segmentation model, wherein the target object segmentation model is a trained neural network which has learned a target object segmentation function;
- performing a target object contour segmentation on the input image to obtain a second target object segmentation image;
- performing a merging operation on corresponding pixels in the first target object segmentation image and the second target object segmentation image, to obtain a final target object segmentation image;
- wherein, if one of a pixel in the first target object segmentation image and a corresponding pixel in the second target object segmentation image, which are subjected to the merging operation, is a target object pixel, that target object pixel is presented as a pixel located at a corresponding position in the final target object segmentation image after the merging operation is performed.

In some embodiments, the target object segmentation model is configured to perform steps comprising:

- extracting a low-level semantic feature information and a high-level semantic feature information from the input image;
- performing an information fusion processing on the low-level semantic feature information and the high-level semantic feature information to obtain a fused feature information;
- performing an up-sampling processing on the fused feature information to obtain the first target object segmentation image.

In some embodiments, wherein the target object segmentation model is configured to extract the low-level semantic feature information and the high-level semantic feature information from the input image by performing steps comprising:

- extracting the low-level semantic feature information from the input image; and
- extracting the high-level semantic feature information from the extracted low-level semantic feature information.

In some embodiments, the target object segmentation model is further configured to adjust the extracted high-level semantic feature information, to obtain an adjusted high-level semantic feature information serving as the high-level semantic feature information for the information fusion processing.

In some embodiments, step of inputting the input image to the preset target object segmentation model comprises: performing a scaling processing on the input image to scale the input image to a predetermined size of an image processed by the target object segmentation model to obtain a scaled input image, and inputting the scaled input image into the target object segmentation model;

step of outputting the first target object segmentation image after the segmentation is performed on the input image by the target object segmentation model comprises: outputting a segmentation image after the segmentation is performed by the target object segmentation model, and obtaining the first target object segmentation image by performing an inverse processing of the scaling processing on the segmentation image.

In some embodiments, step of performing the target object contour segmentation on the input image to obtain the second target object segmentation image comprises: determining the second target object segmentation image according to a difference between the input image and a previous frame in the video.

In some embodiments, step of determining the second target object segmentation image according to the difference between the input image and the previous frame in the video comprises:

- performing a gray-scaling processing on the input image to obtain a first grayscale image;
- performing a gray-scaling processing on the previous frame of the input image to obtain a second grayscale image;
- calculating a difference between corresponding pixels of the first grayscale image and the second grayscale image, and calculating an absolute value of that difference to obtain a difference grayscale image;

binarizing the difference grayscale image to obtain the second target object segmentation image.

In some embodiments, the target object in the first target object segmentation image and the second target object segmentation image are in white, backgrounds in the first target object segmentation image and the second target object segmentation image are in black, and performing the merging operation on corresponding pixels in the first target object segmentation image and the second target object segmentation image comprises: performing an addition operation or an OR operation on corresponding pixels in the first target object segmentation image and the second target object segmentation image.

In some embodiments, the target object segmentation method further comprises: performing an image expansion processing on the final target object segmentation image to optimize the final target object segmentation image.

According to a second aspect of the present disclosure, an electronic device is provided, wherein the electronic device comprises: a processor, a memory, and a program which is stored in the memory and executable by the processor, wherein when the program is executed by the processor, steps of any method as described in the first aspect of the present disclosure are implemented.

According to a third aspect of the present disclosure, a computer readable storage medium is provided, wherein a computer program or an instruction is stored in the computer readable storage medium, and when the computer program or the instruction is executed by a processor, steps of any method as described in the first aspect of the present disclosure are implemented.

Embodiments according to the present disclosure has following advantages:

In the target object segmentation method provided according to the present disclosure, the merging operation is performed on corresponding pixels in the first target object segmentation image and the second target object segmentation image to obtain the final target object segmentation image. Herein, if one of a pixel in the first target object segmentation image and a corresponding pixel in the second target object segmentation image, which are subjected to the merging operation, is a target object pixel, that target object pixel is presented as a pixel located at a corresponding position in the final target object segmentation after the merging operation is performed. Wherein, the first target object segmentation image is obtained through the target object segmentation model, and the second target object segmentation image is obtained through the target object contour segmentation. Therefore, the first target object segmentation image has defects in the determination of the contour of a small-size object, while the second target object segmentation image can remedy for the defects, so the obtained final target object segmentation image has high target object segmentation accuracy.

It should be noted that, the above general description and the following detailed description are only exemplary and explanatory, and not a limit to the present disclosure.

DESCRIPTION OF THE EMBODIMENTS

In order to facilitate an understanding of the present disclosure, a more comprehensive description of the present disclosure will be given below with reference to the related accompanying drawings. Preferred embodiments of the present disclosure are shown in the accompanying drawings. However, the present disclosure can be implemented in different forms and is not limited to the embodiments described herein. On the contrary, in order to make a more thorough and comprehensive understanding of the present disclosure, these embodiments are provided.

Figure 1:
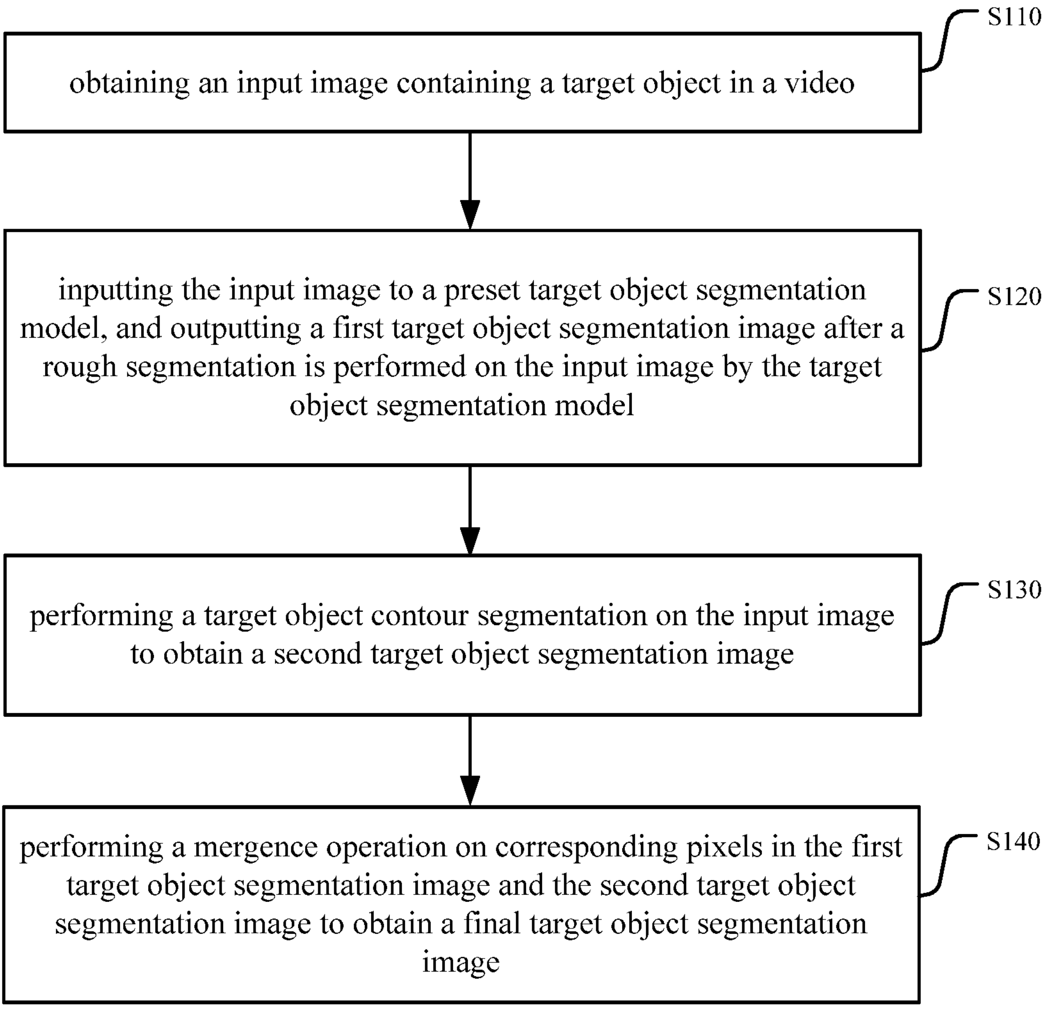
FIG. 1 shows a flowchart of a target object segmentation method according to an embodiment of the present disclosure.

FIG. 1 shows a flowchart of an object segmentation method according to an embodiment of the present disclosure. Referring to FIG. 1, the target object segmentation method includes:

Step S110, obtaining an input image containing a target object in a video.

Specifically, the input image is an image frame containing the target object in the video. Taking the video is a video obtained by shooting a teaching scenario as an example, the target object is a teacher's body parts and belongings carried by the teacher in an application of extracting a board writing image from the image frame in the video. Therefore, in this example, an image frame with a teacher can be used as the above input image.

Step S120, inputting the input image to a preset target object segmentation model, and outputting a first target object segmentation image after a rough segmentation is performed on the input image by the target object segmentation model.

Specifically, the target object segmentation model is a neural network. The trained neural network learns a target object segmentation function, so that it can perform a target object segmentation on the input image, that is, it can identify whether each pixel in the input image is a target object pixel or a background pixel. The target object and the background reach a preset contrast in the first target object segmentation image outputted by the target object segmentation model. It should be understood that the first target object segmentation image has the same size as the input image.

Step S130, performing a target object contour segmentation on the input image to obtain a second target object segmentation image.

Specifically, the target object and the background in the second target object segmentation image also reach a preset contrast. In addition, the second target object segmentation image also has the same size as the input image, so the size of the second target object segmentation image is consistent with the size of the first target object segmentation image, and pixels in the first target object segmentation image and the second target object segmentation image have a one-to-one correspondence in position. In the following description, the pixels in the same position in the first target object segmentation image and the second target object segmentation image are known as corresponding pixels in the first target object segmentation image and the second target object segmentation image. For example, a pixel located in first row and second column of the first target object segmentation image and a pixel located in first row and second column of the second target object segmentation image are a group of corresponding pixels in the two segmentation images.

It should be noted that, the first target object segmentation image and the second target object segmentation image are obtained by different methods, so a pixel in the first target object segmentation image and a corresponding pixel in the second target object segmentation image may not be the pixels included in a same object, that is, one may be a target object pixel and the other may be a background pixel.

Step S140, performing a merging operation on corresponding pixels in the first target object segmentation image and the second target object segmentation image to obtain a final target object segmentation image.

Specifically, if one of a pixel in the first target object segmentation image and a corresponding pixel in the second target object segmentation image, which are subjected to the merging operation, is a target object pixel, that target object pixel is presented as a pixel located at a corresponding position in the final target object segmentation image after the merging operation is performed. It should be understood that, the size of the final target object segmentation image is consistent with the size of the first target object segmentation image, the size of the second target object segmentation image, and the size of the input image.

The above steps are described in detail below.

Figure 2:
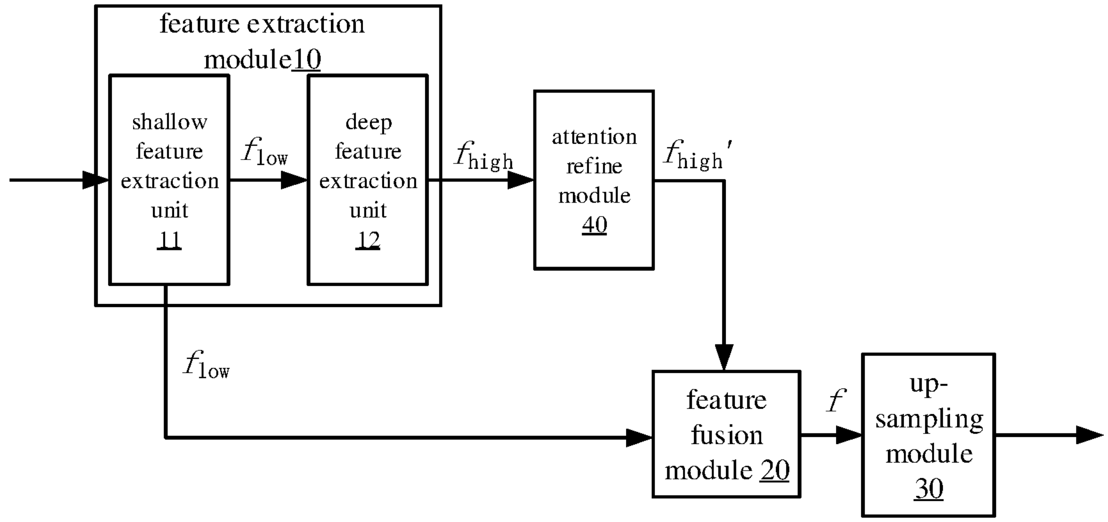
FIG. 2 shows a target object segmentation model according to an embodiment of the present disclosure.
Figure 3:
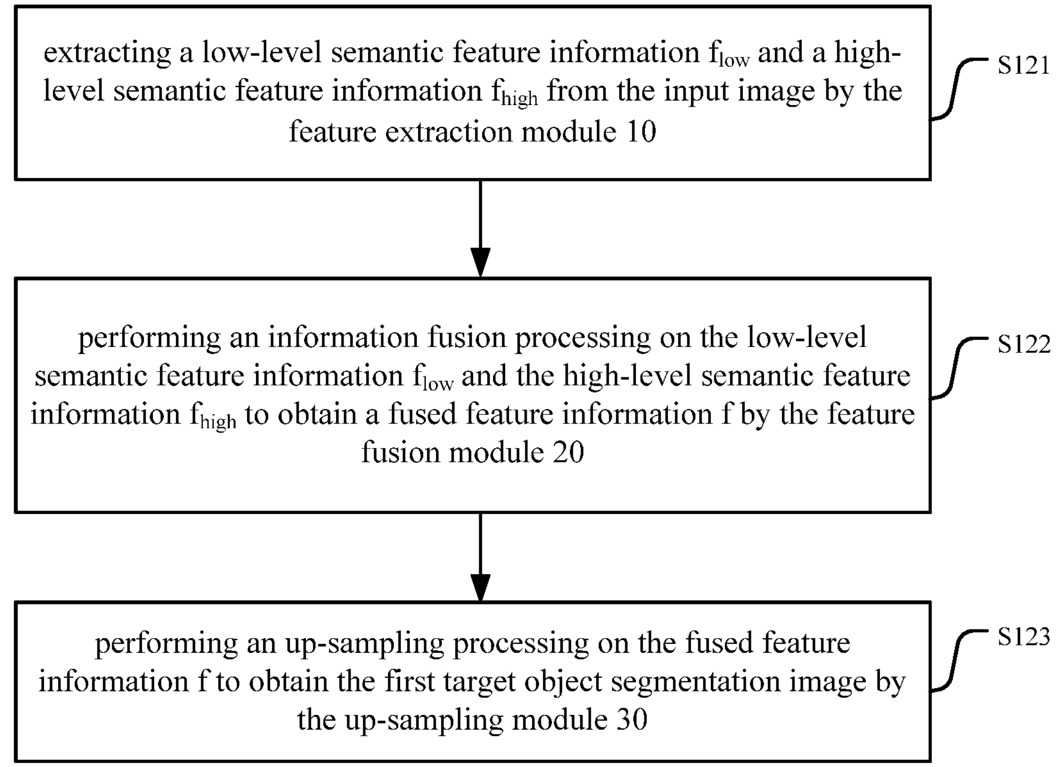
FIG. 3 shows a flowchart of steps performed by a target object segmentation model according to an embodiment of the present disclosure.

FIG. 2 shows a structural schematic view of a target object segmentation model, and FIG. 3 shows a flowchart of steps performed by a target object segmentation model. Referring to FIG. 2, the target object segmentation model includes a feature extraction module 10, a feature fusion module 20 and an up-sampling module 30. Referring to FIG. 3, in an optional embodiment, the following steps are performed in the process of roughly segmenting the input image by the target object segmentation model:

In step S121, a low-level semantic feature information $f_{low}$ and a high-level semantic feature information $f_{high}$ are extracted from the input image by the feature extraction module 10.

In step S122, an information fusion processing is performed on the low-level semantic feature information $f_{low}$ and the high-level semantic feature information $f_{high}$ to obtain a fused feature information f by the feature fusion module 20.

In step S123, an up-sampling processing is performed on the fused feature information f to obtain the first target object segmentation image by the up-sampling module 30.

Specifically, a core structure of the feature extraction module 10 is a convolution layer. The feature extracted by the convolution layer is hierarchical, and different convolution layers have different semantic levels to extract feature information of the different semantic levels. For example, as shown in FIG. 2, one part of a plurality of convolution layers included in the feature extraction module 10 belongs to a shallow feature extraction unit 11 and other part of the plurality of convolution layers included in the feature extraction module 10 belongs to a deep feature extraction unit 12, and the shallow feature extraction unit 11 is connected with the deep feature extraction unit 12. The execution process of step S121 is as follows: the low-level semantic feature information $f_{low}$ is extracted from the input image by the shallow feature extraction unit 11, and the low-level semantic feature information $f_{low}$ extracted by the shallow feature extraction unit 11 is received and the high-level semantic feature information $f_{high}$ is extracted from the received low-level semantic feature information $f_{low}$ by the deep feature extraction unit 12.

The low-level semantic feature information $f_{low}$ is local feature information, such as the feature information of some small parts such as edges/corners, and this kind of feature information usually comes from a visual sensitive area of an image; The high-level semantic feature information $f_{high}$ is global feature information, and this kind of feature information has a high compression rate and weak discrimination for an image. The low-level semantic feature information $f_{low}$ and the high-level semantic feature information $f_{high}$ can complement each other and the above fused feature information f is the information obtained after the low-level semantic feature information $f_{low}$ and the high-level semantic feature information $f_{high}$ complement each other. Compared with the low-level semantic feature information $f_{low}$ and the high-level semantic feature information $f_{high}$, the fused feature information $f_{low}$ is more comprehensive feature information of the input image.

The process of extracting feature information in step S121 involves a down-sampling processing, which reduces image resolution. The fused feature information f corresponds to the image with reduced resolution. Therefore, in step S123, an up-sampling processing is performed on the fused feature information f to restore the resolution, so that the resolution of the final first target object segmentation image is consistent with the resolution of the input image.

Further, referring to FIG. 2, the target object segmentation model can also include an attention refine module 40. The attention refine module 40 is arranged between the feature extraction module 10 and the feature fusion module 20, and configured to adjust the high-level semantic feature information $f_{high}$ transmitted by the feature extraction module 10 to the feature fusion module 20. That is, the target object segmentation model is also configured to perform steps comprising: adjusting the high-level semantic feature information $f_{high}$ extracted by the feature extraction module 10. After the high-level semantic feature information $f_{high}$ is adjusted by the attention refine module 40, the adjusted high-level semantic feature information $f_{high}'$ is used to perform the information fusion processing by the above feature fusion module 20, that is, the information fusion processing is performed on the low-level semantic feature information $f_{low}$ and the adjusted high-level semantic feature information $f_{high}'$ to obtain the fused feature information f by the feature fusion module 20. Compared with the high-level semantic feature information $f_{high}$, the neural network pays more attention to an area of the target object in the process of performing the information fusion processing on the adjusted high-level semantic feature information $f_{high}'$ and the low-level semantic feature information $f_{low}$, which is helpful to improve the execution efficiency of the neural network, so as to improve the rate at which the target object segmentation model outputs the first target object segmentation image.

In some cases, the image frame of the video does not have a predetermined size of an image processed by the target object segmentation model. Therefore, in step S120, inputting the input image into the preset target object segmentation model comprises: performing a scaling processing on the input image to scale the input image to a predetermined size (for example, 896×512, i.e. there are 896 pixels in the horizontal direction and 512 pixels in the vertical direction) of an image processed by the target object segmentation model, and inputting the scaled input image into the target object segmentation model; In step S120, outputting the first target object segmentation image after the rough segmentation is performed on the input image by the target object segmentation model comprises: outputting a segmentation image after the rough segmentation is performed by the target object segmentation model, and obtaining the first target object segmentation image by performing an inverse processing of the scaling processing on the segmentation image. Wherein, the size of the segmentation image is the predetermined size of the image processed by the target object segmentation model.

As a neural network, the trained target object segmentation model has a target object segmentation function, but it realizes a rough segmentation of a target object, can roughly segment a portrait, and has defects in determining a contour of a small-size object. For a small-size object that is relatively smaller than a teacher, such as a pair of glasses, a finger and a marker pen, it is more difficult to determine its contour in a background. Therefore, the target object in the first target object segmentation image may not include some small-size objects that actually belong to the target object.

In another optional embodiment, in step S130, performing the target object contour segmentation on the input image to obtain the second target object segmentation image is to determine the second target object segmentation image based on the difference between the input image and a previous frame in the video.

Figure 4:
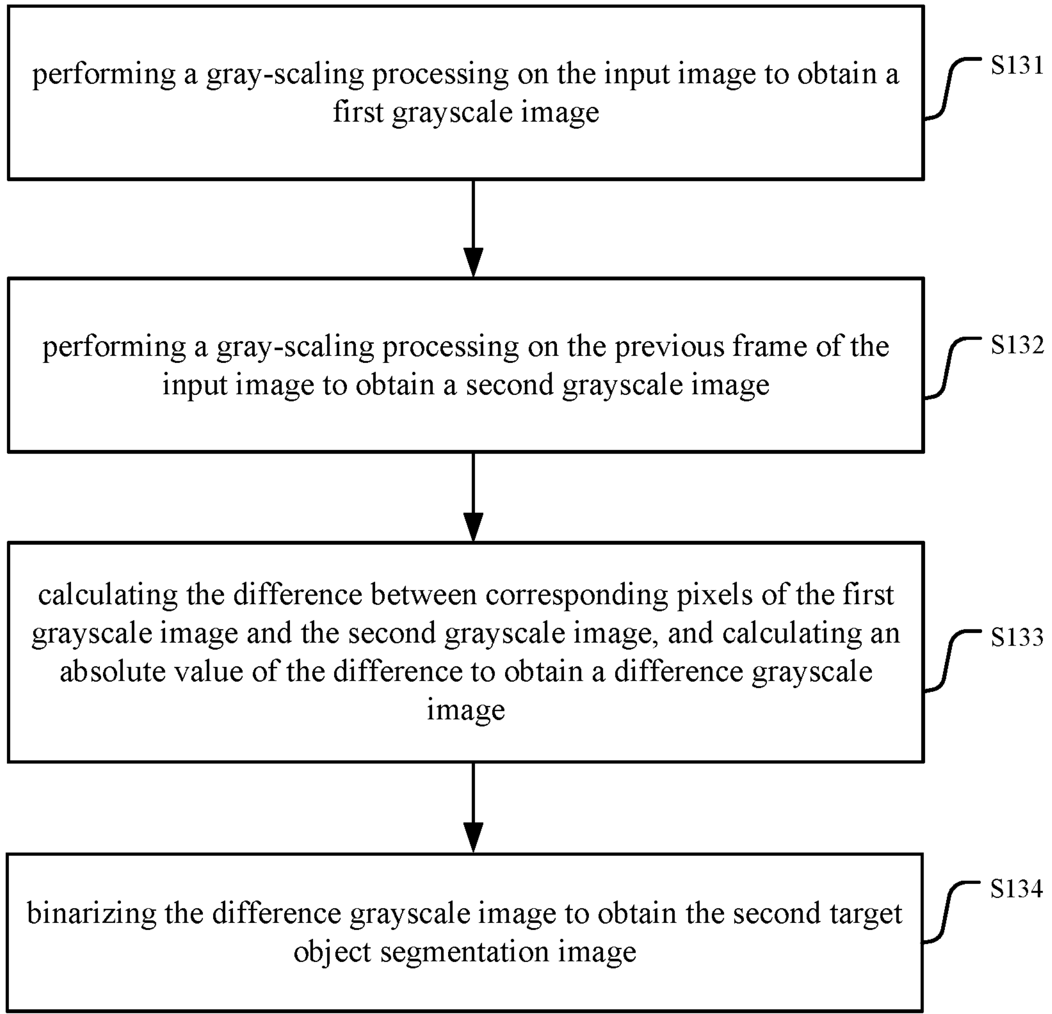
FIG. 4 shows a flowchart of a method to obtain a second target object segmentation image according to an embodiment of the present disclosure.

Further, as shown in FIG. 4, in the case where the target object is a moving person/object and other object in the background is in static state, determining the second target object segmentation image based on the difference between the input image and the previous frame in the video comprises:

Step S131, performing a gray-scaling processing on the input image to obtain a first grayscale image.

Specifically, the gray-scaling processing may be implemented by a conventional method. For example, there is an average value method, that is, the brightness of the three components in the input image is averaged to obtain a grayscale value; For another example, there is a weighted average method, that is, according to the importance and other indicators, the three components in the input image are weighted with different weights and averaged to obtain a grayscale value. It should be understood that the gray-scaling processing does not change the image size, so the size of the first grayscale image is consistent with the size of the input image.

Step S132, performing a gray-scaling processing on the previous frame of the input image to obtain a second grayscale image.

Specifically, the gray-scaling processing method applied to the previous frame is consistent with the gray-scaling processing method applied to the input image. Similarly, the size of the second grayscale image is consistent with the size of the previous frame. Since the image frames in the same video have the same size, the size of the second grayscale image is consistent with the size of the current gray image. In the following description, pixels located at the same position of the first grayscale image and the second grayscale image are referred to as corresponding pixels of the first grayscale image and the second grayscale image.

Step S133, calculating the difference between corresponding pixels of the first grayscale image and the second grayscale image, and calculating an absolute value of the difference to obtain a difference grayscale image.

Specifically, if the first grayscale image is $f_n$ and the second grayscale image is $f_{n-1}$, the difference grayscale image $D_n$ is obtained according to formula (1).

$$D_n(x,y)=|f_n(x,y)-f_{n-1}(x,y)| \tag{1}$$

Wherein, $D_n(x, y)$ represents a grayscale value of a pixel located in row x and column y of the difference grayscale image $D_n$, $f_n(x, y)$ represents a grayscale value of a pixel located in row x and column y of the first gray scale image $f_n$, and $f_{n-1}(x, y)$ represents a grayscale value of a pixel located in row x and column y of the second grayscale image $f_{n-1}$.

Step S134, binarizing the difference grayscale image to obtain the second target object segmentation image.

Specifically, by presetting a threshold value T, pixels in the difference grayscale image $D_n$ can be binarized one by one according to formula (2) to obtain the second target object segmentation image $$M_n^2.$$

$$M_n^2(x, y) = \begin{cases} P_1, & D_n(x, y) > T \\ P_2, & \text{else} \end{cases} \tag{2}$$

Wherein, $$M_n^2(x, y)$$

represents a grayscale value of a pixel located in row x and column y of the second target object segmentation image $$M_n^2,$$

and $P_1$ is not equal to $P_2$.

The sequence of image frames of a video captured by a camera is characterized by continuity. In the case where there is no target object which is moving in a real scenario, a background in the real scenario is still, so the consecutive image frames change very slightly; In the case where there is a target object which is moving in the real scenario, there will be obvious changes between the consecutive image frames. The above steps from S131 to S134 are based on this idea to distinguish between the background and the target object, so as to obtain the second target object segmentation image. Of course, the present disclosure does not limit to the above methods, as long as the solution can accurately segment a contour of a target object, it can be used as a part of the protection scope of the present disclosure.

The previous frame of the input image needs to be used to perform the above steps from S131 to S134, so the input image is any image frame excluding the first frame of the video. For the first frame of the video, the first target object segmentation image can be directly determined as the final target object segmentation image.

The calculation amount of the steps performed in the embodiments of the present disclosure is small, and the target object can be quickly detected, so as to obtain the second target object segmentation image. Moreover, the target object segmentation model can quickly obtain the first target object segmentation image, so the above target object segmentation method provided by the present disclosure can meet a real-time requirement in practical applications.

It should be noted that, in some scenarios, the target object moves slowly, and the position of the target object changes slowly among consecutive image frames. It is difficult to detect an overlapping part of the target object in adjacent image frames through the above steps from S131 to S134. Therefore, the contour of the target object can be accurately determined by performing the steps from S131 to S134, but the determined target object is sometimes incomplete, which is specifically reflected in that the contour of the target object in the second target object segmentation image contains a "void". That is, there is a background pixel inside the contour of the target object, which is actually should be a target object pixel.

In another optional embodiment, in the first target object segmentation image and the second target object segmentation image, the target object is in white and the background is in black. In step S140, performing the merging operation on the corresponding pixels in the first target object segmentation image and the second target object segmentation image comprises: performing an addition operation or an OR operation on the corresponding pixels in the first target object segmentation image and the second target object segmentation image.

Specifically, the addition operation is to add the pixel values of the corresponding pixels in the first target object segmentation image and the second target object segmentation image. If the obtained sum is not less than 255, a pixel located at a corresponding position in the final target object segmentation image is presented in white after performing the addition operation, otherwise, the pixel located at the corresponding position in the final target object segmentation image is presented in black after performing the addition operation.

The OR operation is to perform an OR logic operation on the pixel values of the corresponding pixels in the first target object segmentation image and the second target object segmentation image. Wherein, a white pixel in the first target object segmentation image and the second target object segmentation image corresponds to a logic value "1", and a black pixel in the first target object segmentation image and the second target object segmentation image corresponds to a logic value "0". Therefore, if one of two pixels which are subjected to the OR operation is a white pixel, a pixel located at a corresponding position in the final target object segmentation image is a white pixel after performing the OR operation; if one of the two pixels which are subjected to the OR operation is a black pixel, the pixel located at the corresponding position in the final target object segmentation image is a black pixel after performing the OR operation.

In the embodiments of the present disclosure, the addition operation or the OR operation is performed on the corresponding pixels in the first target object segmentation image and the second target object segmentation image to achieve the following purposes: if one of a pixel in the first target object segmentation image and a corresponding pixel in the second target object segmentation image, which are subjected to the merging operation, is a target object pixel, that target object pixel is presented as a pixel located at a corresponding position in the final target object segmentation image after performing the merging operation.

To sum up, the target object segmentation model has defects in the determination of a contour of a small-size object. The target object in the first target object segmentation image may not include some small-size objects that actually should belong to the target object, and the target object contour segmentation can accurately determine the contour of the target object which just remedies the above defects. Thus, the final target object segmentation image obtained by combining the first target object segmentation image and the second target object segmentation image has high target object segmentation accuracy, and the "void" problem of the second target object segmentation image is also alleviated by the compensation of the first target object segmentation image.

Figure 5:
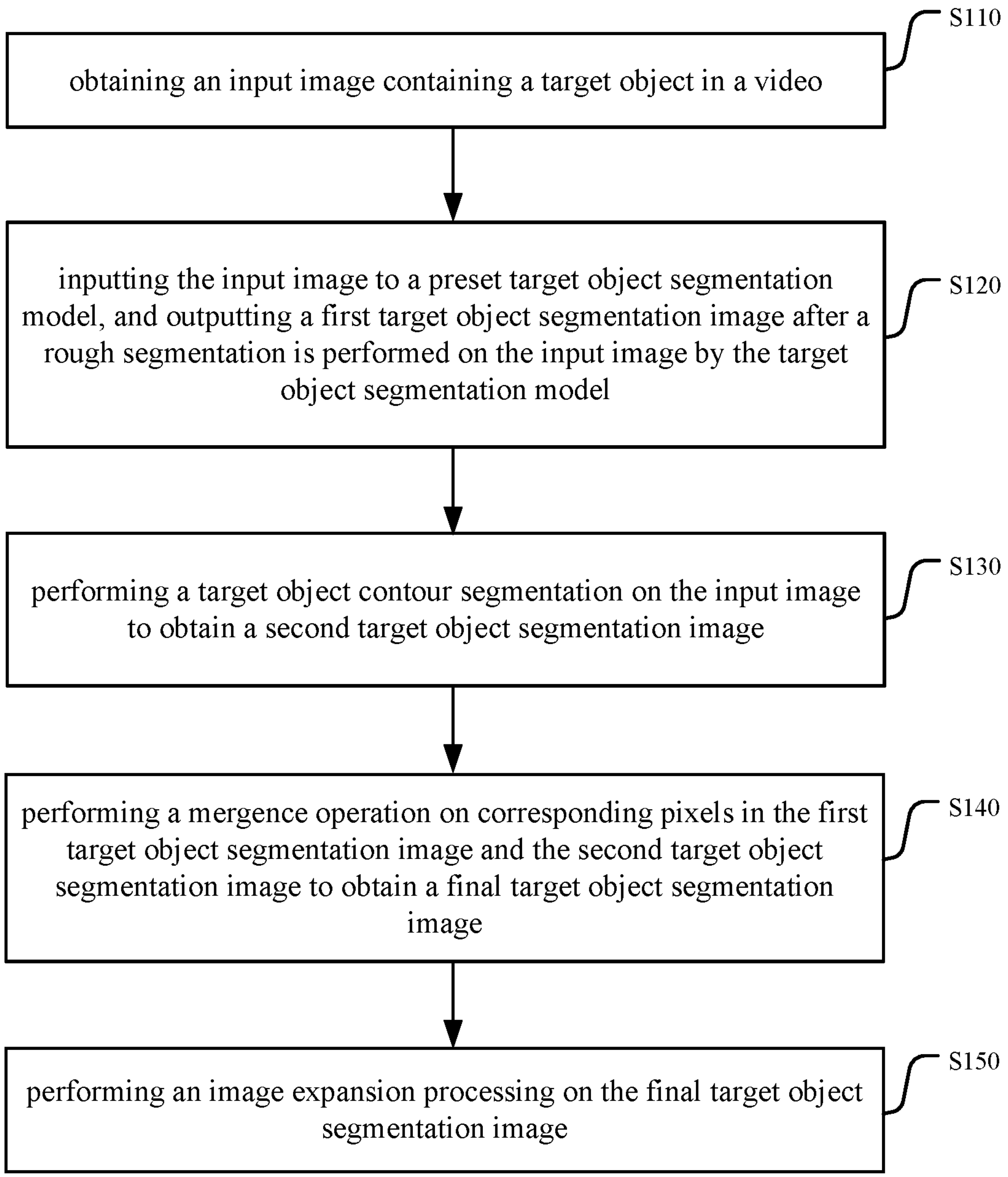
FIG. 5 shows a flowchart of another target object segmentation method according to an embodiment of the present disclosure.

FIG. 5 shows a flowchart of another target object segmentation method according to an embodiment of the present disclosure. Referring to FIG. 5, in an optional embodiment, the target object segmentation method also includes: step S150, performing an image expansion processing on the final target object segmentation image. The final target object segmentation image obtained after performing the image expansion processing is taken as the target object segmentation result obtained by the target object segmentation method provided by the present disclosure.

Specifically, if the target object in the final target object segmentation image is in white and the background in the final target object segmentation image is in black, the process of the above image expansion processing includes: considering a pixel and its 8 surrounding pixels in the final target object segmentation image, and the 9 pixels are arranged into a 3×3 lattice array, the center pixel of which becomes a white pixel when there is a white pixel among its surrounding pixels. It can be seen that the so-called image expansion processing is actually to add image pixels at the edge of the image to expand the pixels of the image as a whole, so as to achieve the image expansion effect.

In the embodiments of the present disclosure, the role of the image expansion processing is to add target object pixels at the edge of the target object in the final target object segmentation image. Because the target object segmentation model has defects in the determination of a contour of a small-size object, the first target object segmentation image cannot remedy for the "void" in the small-size object in the second target object segmentation image, and the above step S150 can remedy for the "void" in the small-size object, thus optimizing the final target object segmentation image, so that the target object segmentation result has a more complete target object.

Figure 6:
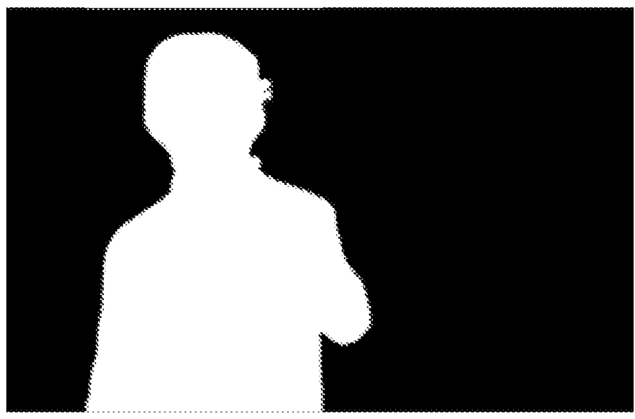
FIG. 6 shows a schematic view of an exemplary target object segmentation result obtained by a target object segmentation method according to an embodiment of the present disclosure.

FIG. 6 shows a schematic view of an exemplary target object segmentation result obtained by a target object segmentation method according to an embodiment of the present disclosure. Referring to FIG. 6, the target object is a portrait. In the target object segmentation result, the portrait includes small-size object such as a glasses rim (as shown in FIG. 6, a part near the top of the head on the right side of the portrait), and there is no "void" inside the contour of the portrait. The target object segmentation result shown in FIG. 6 proves that the target object segmentation method provided by the present disclosure has high segmentation accuracy in practical cases.

Figure 7:
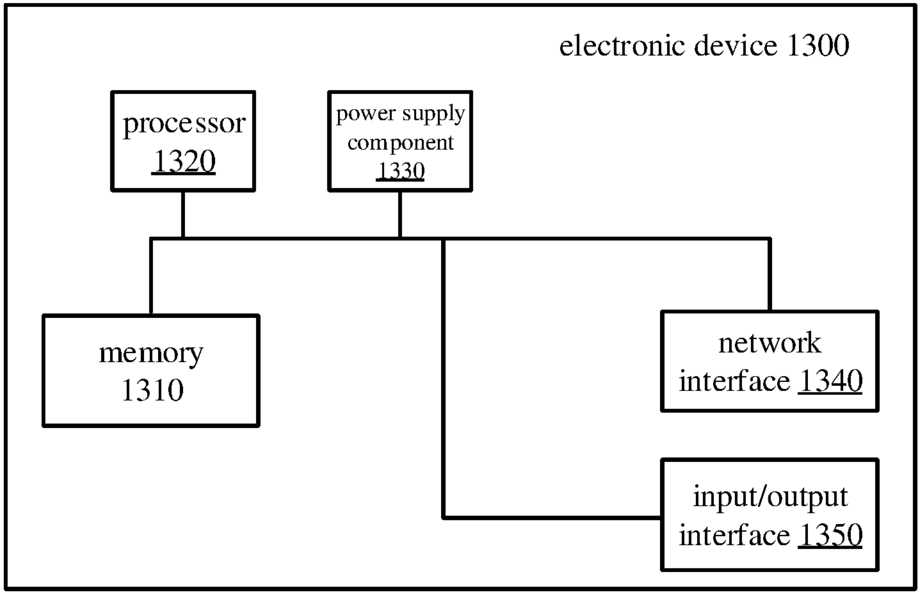
FIG. 7 shows a structural schematic view of an electronic device according to an embodiment of the present disclosure.

An electronic device 1300 is also provided in the embodiments of the present disclosure. As shown in FIG. 7, the electronic device 1300 includes a memory 1310, a processor 1320, and a program stored in the memory 1310 and running on the processor 1320. When the program is executed by the processor 1320, various processes of various embodiments of the target object segmentation method can be realized, and the same technical effect can be achieved. To avoid repetition, it will not be repeated herein. Of course, the electronic device 1300 can also include auxiliary sub-devices such as a power supply component 1330, a network interface 1340 and an input/output interface 1350.

It should be understood by those skilled in the art that all or part of the steps in the various methods of the above embodiments can be completed based on instructions or by hardware related to instruction control. The instructions can be stored in a computer readable storage medium, and loaded and executed by a processor. Thus, a computer readable storage medium is also provided in the embodiments of the present disclosure. The computer program or instructions is stored in the computer readable storage medium, and various processes of various embodiments of the target object segmentation method can be realized when the computer program or instructions are executed by the processor. Wherein, the computer readable storage medium comprises various mediums that can store program codes, such as, USB flash disk, mobile hard disk, read-only memory (ROM), random access memory (RAM), magnetic disk, or optical disk.

The instructions stored in the computer readable storage medium can execute the steps in any target object segmentation method provided in the embodiments of the present disclosure, so the beneficial effects that can be achieved by any target object segmentation method provided in the embodiments of the present disclosure can be achieved, of which the specific details can be seen in the previous embodiments, and will not be repeated herein. The specific implementation of the various operations can refer to the previous embodiments, and will not be repeated herein.

It should be noted that the description of each embodiment in the present disclosure focuses on the differences with other embodiments, and the same or similar parts of each embodiment can be understood by mutual reference. For the system embodiment, since it is basically similar to the method embodiment, the relevant points can refer to the description of the method embodiment.

In addition, it should be noted that in the device and method in the present disclosure, it is obvious that each component or step can be disassembled and/or reassembled. The disassembly and/or reassembly shall be considered as the equivalent schemes of the present disclosure. In addition, the steps of executing the above series of processing can be executed in chronological order naturally according to the described order, but is not necessary to be executed in chronological order. Some steps can be executed in parallel or independently of each other. For those skilled in the art, they can understand that all or any steps or components of the method and device in the present disclosure can be implemented in way of hardware, firmware, software, or their combinations in any computing device (including processor, storage medium, etc.) or a network of computing devices, which can be achieved by those skilled in the art using their basic programming skills after reading the description of the present disclosure.

Finally, it should be noted that, obviously, the above embodiments are only examples to clearly illustrate the present disclosure, and are not intended to limit the implementation manner. For those skilled in the art, other changes or modifications in different forms can be made on the basis of the above description. It is unnecessary and impossible to exhaustively enumerate all embodiments herein. The obvious changes or modifications derived from this are still within the protection scope of the present disclosure.

What is claimed is:

1. A target object segmentation method, comprising:

obtaining an input image containing a target object in a video;

inputting the input image to a preset target object segmentation model, and outputting a first target object segmentation image after a segmentation is performed on the input image by the target object segmentation model, wherein the target object segmentation model is a trained neural network which has learned a target object segmentation function;

performing a target object contour segmentation on the input image to obtain a second target object segmentation image, wherein the second target object segmentation image is generated according to a difference between the input image and a previous frame in the video;

performing a merging operation on corresponding pixels in the first target object segmentation image and the second target object segmentation image, to obtain a final target object segmentation image as a binary image, which only contains black and white pixels and represents the target object by using object pixels with a first logic value different from background pixels with a second logic value;

wherein, if one of a pixel in the first target object segmentation image and a corresponding pixel in the second target object segmentation image, which are subjected to the merging operation, is a target object pixel, that target object pixel is presented as a pixel located at a corresponding position in the final target object segmentation image after the merging operation is performed, wherein after the merging operation, the target object segmentation method further performs an image expansion processing on the binary image, wherein the image expansion processing comprises: setting a center pixel of a lattice array in the binary image as one of the object pixels when at least one other pixel in that lattice array is determined as a pixel of the target object.

2. The target object segmentation method according to claim 1, wherein the target object segmentation model is configured to perform steps comprising:

extracting a low-level semantic feature information and a high-level semantic feature information from the input image;

performing an information fusion processing on the low-level semantic feature information and the high-level semantic feature information to obtain a fused feature information;

performing an up-sampling processing on the fused feature information to obtain the first target object segmentation image.

3. The target object segmentation method according to claim 2, wherein the target object segmentation model is configured to extract the low-level semantic feature information and the high-level semantic feature information from the input image by performing steps comprising:

extracting the low-level semantic feature information from the input image; and extracting the high-level semantic feature information from the extracted low-level semantic feature information.

4. The target object segmentation method according to claim 2, wherein the target object segmentation model is further configured to adjust the extracted high-level semantic feature information for the information fusion processing.

5. The target object segmentation method according to claim 1, wherein the step of inputting the input image to the preset target object segmentation model comprises: performing a scaling processing on the input image to scale the input image to a predetermined size of an image processed by the target object segmentation model to obtain a scaled input image, and inputting the scaled input image into the target object segmentation model;

step of outputting the first target object segmentation image after the segmentation is performed on the input image by the target object segmentation model comprises: outputting a segmentation image after the segmentation is performed by the target object segmentation model, and obtaining the first target object segmentation image by performing an inverse processing of the scaling processing on the segmentation image.

6. The target object segmentation method according to claim 1, wherein the step of determining the second target object segmentation image according to the difference between the input image and the previous frame in the video comprises:

performing a gray-scaling processing on the input image to obtain a first grayscale image;

performing a gray-scaling processing on the previous frame of the input image to obtain a second grayscale image;

calculating a difference between corresponding pixels of the first grayscale image and the second grayscale image, and calculating an absolute value of that difference to obtain a difference grayscale image;

binarizing the difference grayscale image to obtain the second target object segmentation image.

7. The target object segmentation method according to claim 1, wherein the target object in the first target object segmentation image and the second target object segmentation image are in white, backgrounds in the first target object segmentation image and the second target object segmentation image are in black, and performing the merging operation on corresponding pixels in the first target object segmentation image and the second target object segmentation image comprises: performing an addition operation or an OR operation on corresponding pixels in the first target object segmentation image and the second target object segmentation image.

8. An electronic device, comprising: a processor, a memory, and a program which is stored in the memory and executable by the processor, wherein when the program is executed by the processor, steps of a method according to claim 1 are implemented.

9. A non-transitory computer readable storage medium, storing a computer program or an instruction that when executed by a processor, causes the processor to perform the method according to claim 1.

10. The target object segmentation method according to claim 1, wherein the image expansion processing comprises: for at least one pixel in the binary image, considering that pixel as the center pixel which corresponds to the lattice array having 9 pixels arranged in a 3 by 3 array, including the center pixel and 8 surrounding pixels adjacent to the center pixel.

* * * * *